No. 679,808. Patented Aug. 6, 1901.
G. W. WEST.
LOCOMOTIVE.
(Application filed Feb. 9, 1900.)

(No Model.) 4 Sheets—Sheet 1.

Witnesses: Inventor:

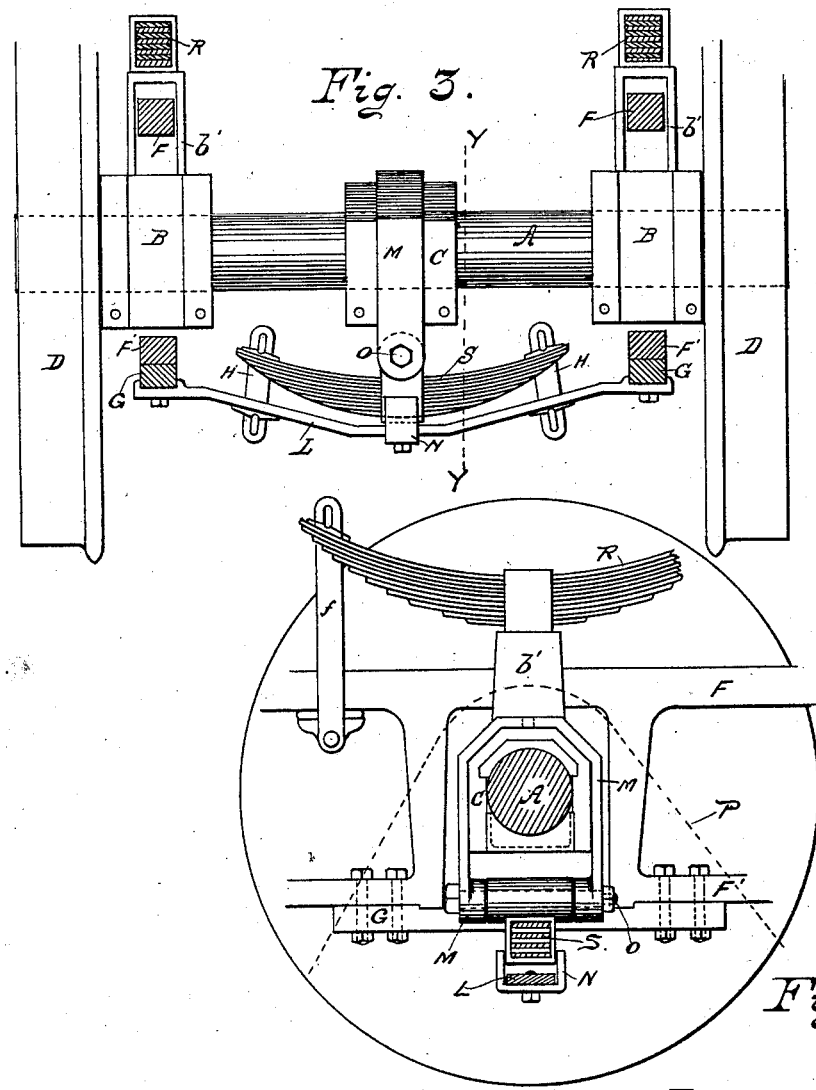

No. 679,808.  
G. W. WEST.  
LOCOMOTIVE.  
(Application filed Feb. 9, 1900.)

Patented Aug. 6, 1901.

(No Model.)

4 Sheets—Sheet 3.

Witnesses:

Inventor:

No. 679,808. Patented Aug. 6, 1901.
G. W. WEST.
LOCOMOTIVE.
(Application filed Feb. 9, 1900.)
(No Model.) 4 Sheets—Sheet 4.
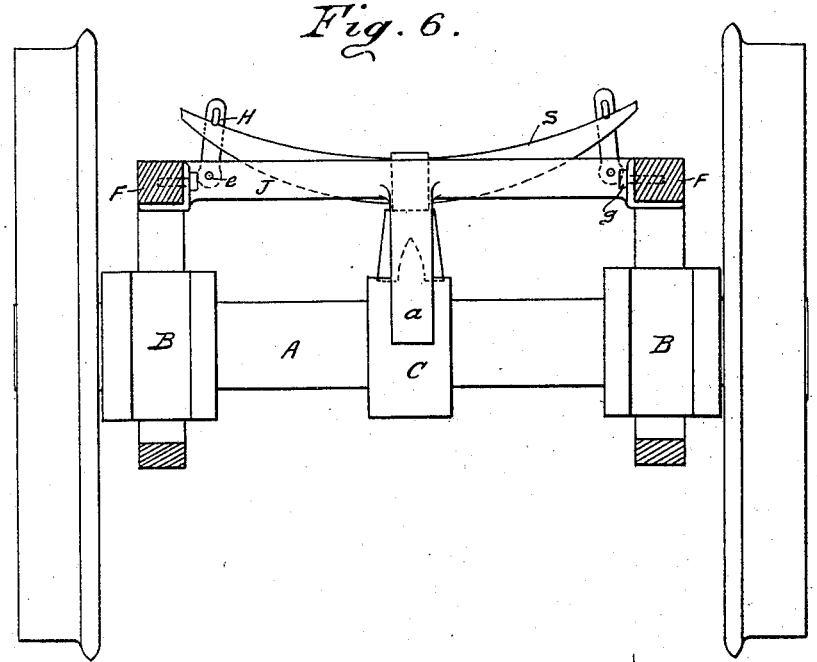
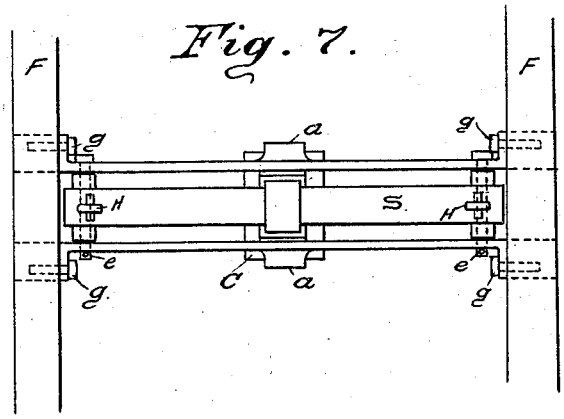
Witnesses: Inventor:
George W. West
pr. W. H. Davis
Atty.

UNITED STATES PATENT OFFICE.

GEORGE W. WEST, OF MIDDLETOWN, NEW YORK.

LOCOMOTIVE.

SPECIFICATION forming part of Letters Patent No. 679,808, dated August 6, 1901.

Application filed February 9, 1900. Serial No. 4,626. (No model.)

*To all whom it may concern:*

Be it known that I, GEORGE W. WEST, a citizen of the United States, residing at Middletown, in the county of Orange and State of New York, have invented a new and useful Improvement in Locomotives, of which the following is a specification.

The extremely heavy locomotives that are now being built and the limited space on the axles for the lengths of the driving-box bearings are often productive of sufficient friction (when running at the usual train speeds) to cause the axles and bearings to become heated and necessitate long stops and consequent delays and danger therefrom.

The object of my invention is to distribute the weight of the locomotive on the axle by placing an extra journal-bearing upon the axle, and thus reduce the amount of pressure per square inch of bearing-surface in proportion to the extra bearing-surface acquired. As the weight of the locomotive is distributed to the bearings through a system of springs and their connections to alleviate the effects of sudden severe shocks from the bearings, the success of my invention requires the third or auxiliary journal-bearing to uphold its proportionate weight of the locomotive in a like manner.

The accompanying drawings illustrate my invention and are intended to be a part of this specification, and the letters used refer to like parts in the different views or parts that are used in similar capacities.

Figure 1:
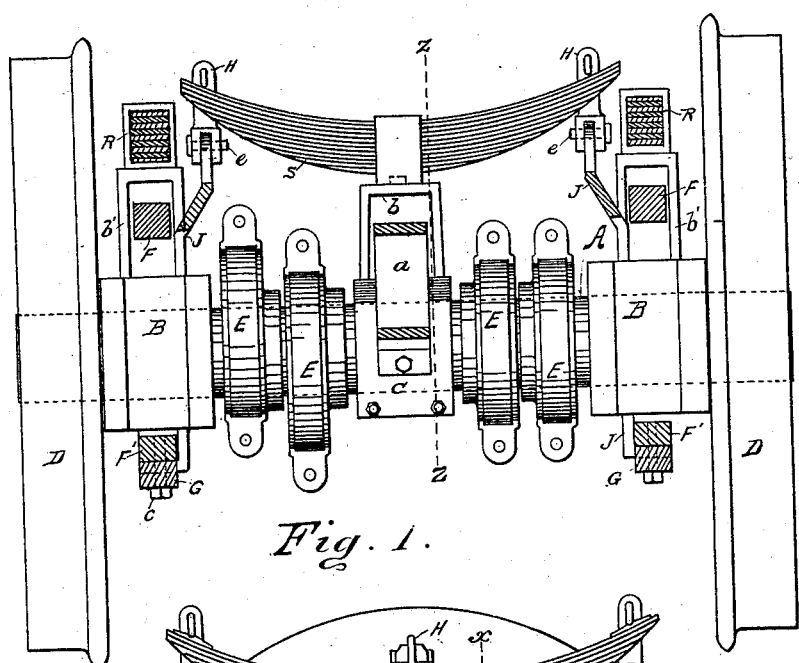
Figure 2:
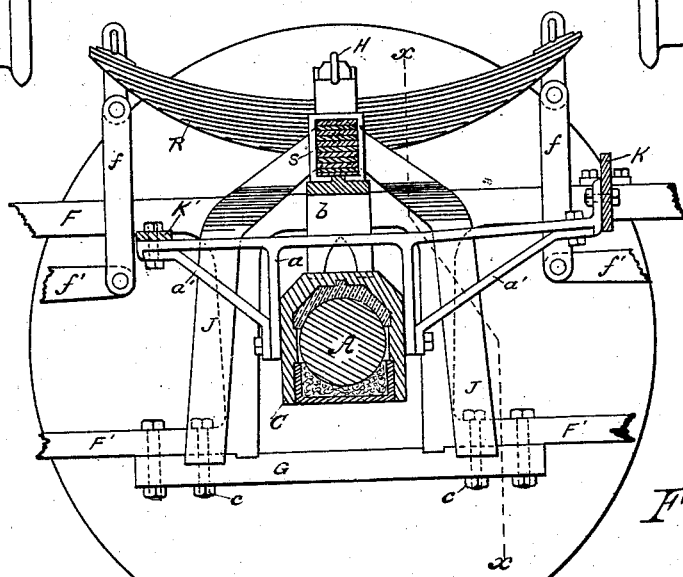
Figure 5:
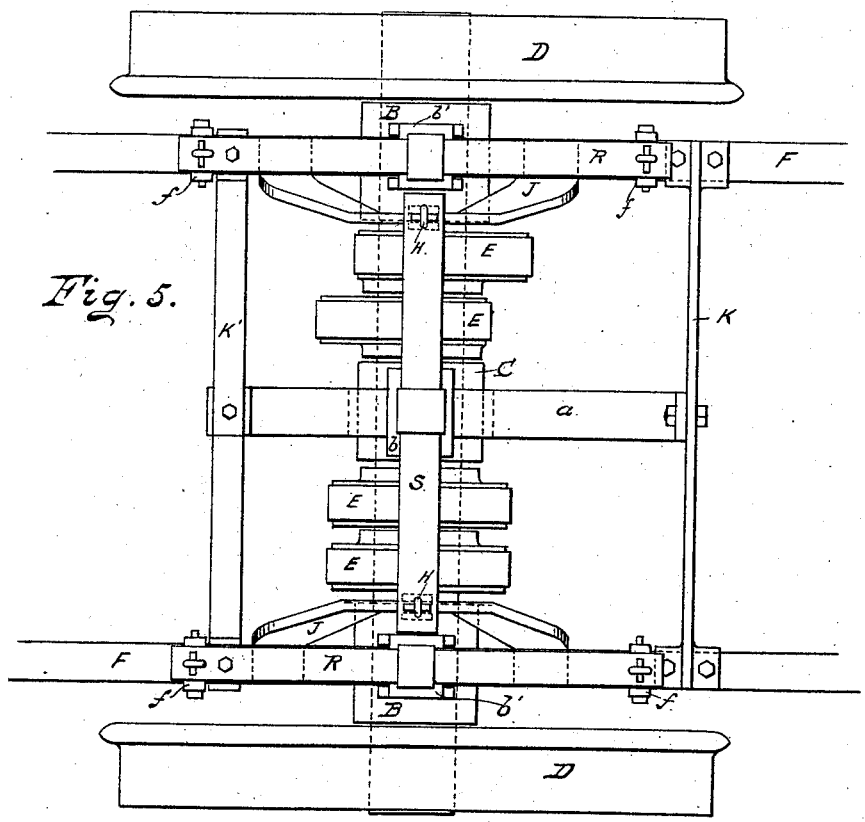

Figure 1 is a side view of the main axle of a locomotive (with one-half of straps on the eccentrics) at line $x$, Fig. 2. Fig. 2 is a sectional view longitudinally of a part of locomotive through the center-bearing at line $z$, Fig. 1. Fig. 3 is a modification of Fig. 1, giving side view of axle with the center-bearing connected to frame from underneath. Fig. 4 is a section of Fig. 3 through line Y. Fig. 5 is a plan view of Fig. 1. Fig. 6 is a simplified form of Fig. 1. Fig. 7 is a plan view of Fig. 6.

Referring to Figs. 1 and 2, the main axle A is shown with the main bearings or driving-boxes B close to the side of driving-wheels D, with the spring-saddle $b'$ straddling the upper rail of frame F and the main driving-springs R resting on top of saddle $b'$, the springs R being connected to equalizers $f'$ by the hangers $f$ and the equalizers attached to locomotive-frame F, none of which is claimed as new, but is in common use. The weight of locomotive-boiler resting on the frame is thus communicated to the springs and subsequently to the driving-boxes.

By applying a hanger J directly to the frame F or F' on opposite sides of the locomotive and connecting thereto a spring S by means of the connection H, as shown in Fig. 1, with the center band of the spring S impinging on a saddle $b$, which rests on the driving-box C in the center of axle A, a part of the weight of the locomotive is thus sustained by the center-bearing and a corresponding amount of weight removed from the main bearings B, the amount of weight being regulated by the length of the hangers H, which changes the tension of spring S. The spring S is shown of sufficient height above the axles as to clear the eccentric-straps when the locomotive is working.

In the drawings, Figs. 1, 2, and 5, the bifurcated hangers J are shown as spreading over the main driving-boxes B, with a foot on each end, which is secured to frame F by the bolts $c\ c$ passing through the foot of hanger. These bolts also assist in fastening the pedestal-brace G to frame F.

The drawings show the pedestal-brace G mortised out to allow the foot of hanger to be fitted between it and the frame F'. Thus the hanger is not disturbed when the pedestal-brace G is removed when necessary to repack the driving-box cellars. In some instances (where other parts of the locomotive are in the way) it is not feasible for the hanger J to be attached to the lower part of frame F'; but the same results are obtained by connecting the ends of the spring S to the frame F by some other intermediate communication, as shown in Fig. 6, wherein the two braces J are bolted to the upper rail of frame by the bolts $g$, and the hangers H (shown in the dotted line) are attached to braces at $e$. In this form the braces J are substituted for the bifurcated hanger shown in Figs. 1 and 2. The drawings, Figs. 6 and 7, show also a simplified manner of holding driving-box C from turning on the axle.

The third or auxiliary driving-box C is made similarly to the commonly-known driving-box, with a composite metal for a bearing on axle and an oil-cellar fitted underneath. To arrest this driving-box from turning around with the axle in case of excessive friction, (caused by poor or non lubrication,) it is finished on the two sides so that they present two flat vertical surfaces parallel with each other, and the two jaws of the brace a are fitted to these two finished sides of the driving-box, holding the same from turning, but allowing a vertical movement, as required, for the flexibility of the spring. The jaws of the braces a are made firm at the extremities by being strengthened by diagonal braces connected thereto. The forward end of brace a is firmly bolted to the frame cross-brace K and the rear end to cross-brace K', or it may be extended and bolted to the front end of fire-box.

The foregoing specification refers to an axle with the third bearing, having the spring S applied from above; but in some instances there is not room to apply them over the axle, as in the case of the rear axle, which may and usually does pass under the ash-pan, as shown in Figs. 3 and 4, in which the dotted line P represents the shape of the ash-pan, which extends sidewise from frame to frame, so that the axle cannot be approached from above. In this case the spring S is suspended underneath the axle by the hangers H, which pass through an opening in cross-brace L. This brace is secured at the outer ends to the pedestal-brace G, thus becoming a part of the frame of the locomotive. The spring S in this modification is attached to the strap M by the bolt O passing through a hole in the spring-band and the two ends of the strap M, thus securing the spring and strap together, so that any lowering of the frame of the locomotive will place the weight on the ends of the spring S, communicated to the same by the cross-brace L and the hangers H and transmitted to the top of bearing by the strap M. The strap M is shaped on its inner or under side so as to fit the top of the driving-box C, and a pin is driven through this strap and into the top of driving-box to secure the strap from moving sidewise. This driving-box is also fitted with composite-metal bearing and oil-cellar. To arrest this form of driving-box C from turning with the axle A, the forked forging N is secured to cross-brace L by a bolt or screw, as shown, and the inside of the forging N straddles the spring-band, holding the spring S and strap M in the desired position, but leaving them free for any vertical movement. The same adjustment of weight on the spring S is obtainable through the lengthening or shortening of hangers H, as in Figs. 1 and 2.

By distributing the weight of the locomotive to three journals instead of two and increasing the length of them to the extent of the width of the extra bearing the advantages gained are a reduction in pressure per square inch, and consequently a less liability of becoming heated. The same results would probably be obtained by lengthening the ordinary driving-boxes; but this cannot be done for the lack of space between the locomotive-frame and the driving-wheels.

By using an additional spring for the center bearing the ordinary springs can be made lighter, giving greater elasticity and reducing the force of the shocks to the driving-boxes caused by the wheels running over inequalities of the tracks.

Having described my invention, what I claim, and desire to secure by Letters Patent, is—

1. The combination with a locomotive-axle having an intermediate journal-bearing between the ordinary bearings, of journal-box C, sustaining part of the weight of the locomotive through the spring S, and hangers H and J, connected to the locomotive between the pedestal-brace G and frame F, substantially as described.

2. A third journal in the center of a locomotive-axle in combination with driving-box C and spring S impinging on the same, the resisting ends of spring being attached to the frame of locomotive by an intermediate connection, substantially as described.

3. A third journal in center of locomotive-axle in combination with driving-box C, held in position by braces a and a', bolted to cross-braces K and K' substantially as shown and for purposes set forth.

In testimony whereof I have signed my name to this specification in the presence of two subscribing witnesses.

GEO. W. WEST.

Witnesses:
  A. H. MESSINGER,
  LOUIS D. FOUGERT.